United States Patent
Sehn

(10) Patent No.: US 9,430,783 B1
(45) Date of Patent: Aug. 30, 2016

(54) PRIORITIZATION OF MESSAGES WITHIN GALLERY

(71) Applicant: Snapchat, Inc., Venice, CA (US)

(72) Inventor: Timothy Michael Sehn, Marina Del Rey, CA (US)

(73) Assignee: Snapchat, Inc., Venice, CA (US)

( * ) Notice: Subject to any disclaimer, the term of this patent is extended or adjusted under 35 U.S.C. 154(b) by 0 days.

(21) Appl. No.: 14/808,283

(22) Filed: Jul. 24, 2015

Related U.S. Application Data

(63) Continuation of application No. 14/523,728, filed on Oct. 24, 2014, now Pat. No. 9,094,137.

(51) Int. Cl.
*H04W 4/00* (2009.01)
*G06Q 30/02* (2012.01)
*H04W 4/02* (2009.01)
*H04W 4/12* (2009.01)

(52) U.S. Cl.
CPC ......... *G06Q 30/0276* (2013.01); *H04W 4/021* (2013.01); *H04W 4/12* (2013.01)

(58) Field of Classification Search
CPC ...... H04W 36/00; H04W 4/021; H04W 4/12
USPC .......................................... 466/466; 370/338
See application file for complete search history.

(56) References Cited

U.S. PATENT DOCUMENTS

| | | |
|---|---|---|
| 5,999,932 A | 12/1999 | Paul |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,216,141 B1 * | 4/2001 | Straub ............ G06F 9/543 709/203 |
| 6,310,694 B1 | 10/2001 | Okimoto et al. |
| 6,353,170 B1 | 3/2002 | Eyzaguirre et al. |
| 6,484,196 B1 | 11/2002 | Maurille |
| 6,665,531 B1 | 12/2003 | Soderbacka et al. |
| 6,724,403 B1 | 4/2004 | Santoro et al. |
| 6,757,713 B1 | 6/2004 | Ogilvie et al. |
| 6,898,626 B2 | 5/2005 | Ohashi |
| 6,981,040 B1 | 12/2005 | Konig et al. |
| 7,027,124 B2 | 4/2006 | Foote et al. |
| 7,124,164 B1 | 10/2006 | Chemtob |

(Continued)

FOREIGN PATENT DOCUMENTS

| | | |
|---|---|---|
| WO | WO-2011040821 A1 | 4/2011 |
| WO | WO-2015192026 A1 | 12/2015 |

(Continued)

OTHER PUBLICATIONS

"U.S. Appl. No. 14/505,478, Non Final Office Action mailed Sep. 4, 2015", 19 pgs.

(Continued)

*Primary Examiner* — Marcos Batista
(74) *Attorney, Agent, or Firm* — Schwegman Lundberg & Woessner, P.A.

(57) ABSTRACT

In some embodiments, a computer implemented method of processing messages may include creating a gallery using messages received from user devices; scanning the messages to identify a selected message of messages; receiving, from an owner of the brand, a prioritization of the selected message; prioritizing, in response to the prioritization, the selected message in the gallery; and supplying the gallery to a user device for display to a user of the user device.

20 Claims, 6 Drawing Sheets

(56) References Cited

U.S. PATENT DOCUMENTS

| | | |
|---|---|---|
| 7,149,893 B1 | 12/2006 | Leonard et al. |
| 7,203,380 B2 | 4/2007 | Chiu et al. |
| 7,356,564 B2 | 4/2008 | Hartselle et al. |
| 7,519,670 B2 | 4/2009 | Hagale et al. |
| 7,778,973 B2 | 8/2010 | Choi |
| 8,001,204 B2 | 8/2011 | Burtner et al. |
| 8,112,716 B2 | 2/2012 | Kobayashi |
| 8,234,350 B1 | 7/2012 | Gu et al. |
| 8,276,092 B1 | 9/2012 | Narayanan et al. |
| 8,279,319 B2 | 10/2012 | Date |
| 8,312,086 B2 | 11/2012 | Velusamy et al. |
| 8,312,097 B1 | 11/2012 | Siegel et al. |
| 8,379,130 B2 | 2/2013 | Forutanpour et al. |
| 8,405,773 B2 | 3/2013 | Hayashi et al. |
| 8,418,067 B2 | 4/2013 | Cheng et al. |
| 8,471,914 B2 | 6/2013 | Sakiyama et al. |
| 8,560,612 B2 | 10/2013 | Kilmer et al. |
| 8,744,523 B2 | 6/2014 | Fan et al. |
| 8,745,132 B2 | 6/2014 | Obradovich |
| 8,775,972 B2 | 7/2014 | Spiegel |
| 8,788,680 B1 | 7/2014 | Naik |
| 8,797,415 B2 | 8/2014 | Arnold |
| 8,856,349 B2 | 10/2014 | Jain et al. |
| 8,909,725 B1 | 12/2014 | Sehn |
| 9,094,137 B1 | 7/2015 | Sehn et al. |
| 9,113,301 B1 | 8/2015 | Spiegel et al. |
| 9,385,983 B1 | 7/2016 | Sehn |
| 2002/0047868 A1 | 4/2002 | Miyazawa |
| 2002/0078456 A1 | 6/2002 | Hudson et al. |
| 2002/0122659 A1 | 9/2002 | Mcgrath et al. |
| 2002/0144154 A1 | 10/2002 | Tomkow |
| 2003/0016247 A1 | 1/2003 | Lai et al. |
| 2003/0017823 A1 | 1/2003 | Mager et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0164856 A1 | 9/2003 | Prager et al. |
| 2004/0027371 A1 | 2/2004 | Jaeger |
| 2004/0111467 A1 | 6/2004 | Willis |
| 2004/0203959 A1 | 10/2004 | Coombes |
| 2004/0243531 A1 | 12/2004 | Dean |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2006/0114338 A1 | 6/2006 | Rothschild |
| 2006/0270419 A1 | 11/2006 | Crowley et al. |
| 2007/0040931 A1 | 2/2007 | Nishizawa |
| 2007/0073823 A1 | 3/2007 | Cohen et al. |
| 2007/0082707 A1 | 4/2007 | Flynt et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0049704 A1 | 2/2008 | Witteman et al. |
| 2008/0104503 A1 | 5/2008 | Beall et al. |
| 2008/0207176 A1 | 8/2008 | Brackbill et al. |
| 2008/0208692 A1 | 8/2008 | Garaventi et al. |
| 2008/0222545 A1 | 9/2008 | Lemay |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0157752 A1 | 6/2009 | Gonzalez |
| 2009/0160970 A1 | 6/2009 | Fredlund et al. |
| 2009/0177299 A1 | 7/2009 | Van De Sluis |
| 2009/0265647 A1 | 10/2009 | Martin et al. |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0159944 A1 | 6/2010 | Pascal et al. |
| 2010/0161831 A1 | 6/2010 | Haas et al. |
| 2010/0183280 A1 | 7/2010 | Beauregard et al. |
| 2010/0185665 A1 | 7/2010 | Horn et al. |
| 2010/0191631 A1 | 7/2010 | Weidmann |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0102630 A1 | 5/2011 | Rukes |
| 2011/0145564 A1 | 6/2011 | Moshir et al. |
| 2011/0211534 A1* | 9/2011 | Schmidt ............... H04W 4/023 370/328 |
| 2011/0255736 A1 | 10/2011 | Thompson et al. |
| 2011/0273575 A1 | 11/2011 | Lee |
| 2011/0283188 A1 | 11/2011 | Farrenkopf |
| 2011/0320373 A1 | 12/2011 | Lee et al. |
| 2012/0036443 A1 | 2/2012 | Ohmori et al. |
| 2012/0054797 A1 | 3/2012 | Skog et al. |
| 2012/0062805 A1* | 3/2012 | Candelore ............ H04N 5/4403 348/734 |
| 2012/0084835 A1 | 4/2012 | Thomas et al. |
| 2012/0108293 A1 | 5/2012 | Law et al. |
| 2012/0110096 A1 | 5/2012 | Smarr et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0184248 A1 | 7/2012 | Speede |
| 2012/0200743 A1 | 8/2012 | Blanchflower et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0307096 A1 | 12/2012 | Bray et al. |
| 2012/0323933 A1 | 12/2012 | He et al. |
| 2013/0024757 A1 | 1/2013 | Doll et al. |
| 2013/0045753 A1 | 2/2013 | Obermeyer et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |

(56) References Cited

U.S. PATENT DOCUMENTS

| | | |
|---|---|---|
| 2013/0085790 A1 | 4/2013 | Palmer et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0290443 A1 | 10/2013 | Collins et al. |
| 2013/0304646 A1 | 11/2013 | De Geer |
| 2013/0344896 A1 | 12/2013 | Kirmse et al. |
| 2013/0346869 A1 | 12/2013 | Asver et al. |
| 2013/0346877 A1* | 12/2013 | Borovoy ............... H04L 65/403 715/753 |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0279061 A1 | 9/2014 | Elimeliah et al. |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0317302 A1 | 10/2014 | Naik |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb |
| 2015/0088622 A1 | 3/2015 | Ganschow et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |

FOREIGN PATENT DOCUMENTS

| | | |
|---|---|---|
| WO | WO-2016054562 A1 | 4/2016 |
| WO | WO-2016065131 A1 | 4/2016 |

OTHER PUBLICATIONS

"U.S. Appl. No. 14/529,064,Response filed Oct. 12, 2015 to Final Office Action mailed Aug. 11, 2015", 19 pgs.

"U.S. Appl. No. 14/612,692, Examiner Interview Summary mailed Aug. 14, 2015", 3 pgs.

"U.S. Appl. No. 14/612,692, Response filed Oct. 19, 2015 to Non Final Office Action mailed Jul. 20, 2015", 11 pgs.

"U.S. Appl. No. 14/578,258, Response filed Dec. 10, 2015 to Non Final Office Action mailed Jun. 10, 2015", 11 pgs.

"U.S. Appl. No. 14/578,271, Final Office Action mailed Dec. 3, 2015", 15 pgs.

"U.S. Appl. No. 14/578,271, Response filed Feb. 9, 2016 to Final Office Action mailed Dec. 3, 2015", 10 pgs.

"U.S. Appl. No. 14/578,271, Response filed Oct. 28, 2015 to Non Final Office Action mailed Aug. 7, 2015", 9 pgs.

"U.S. Appl. No. 14/612,692, Examiner Interview Summary mailed Jan. 29, 2016", 5 pgs.

"U.S. Appl. No. 14/612,692, Final Office Action mailed Nov. 23, 2015", 15 pgs.

"U.S. Appl. No. 14/612,692, Response filed Feb. 23, 2016 to Final Office Action mailed Nov. 23, 2015", 10 pgs.

"U.S. Appl. No. 14/704,212, Non Final Office Action mailed Dec. 4, 2015", 17 pgs.

"U.S. Appl. No. 14/967,472, Preliminary Amendment filed Dec. 15, 2015", 6 pgs.

"International Application Serial No. PCT/US2015/053811, International Search Report mailed Nov. 23, 2015", 5 pgs.

"International Application Serial No. PCT/US2015/053811, Written Opinion mailed Nov. 23, 2015", 8 pgs.

"International Application Serial No. PCT/US2015/056884, International Search Report mailed Dec. 22, 2015", 5 pgs.

"International Application Serial No. PCT/US2015/056884, Written Opinion mailed Dec. 22, 2015", 6 pgs.

"PearlEyes by Red Giant", © 2002-2015 Red Giant LLC, [Online]. Retrieved from the Internet: <URL:http://www.redgiant.com/products/pluraleyes/, (Accessed Nov. 11, 2015), 5 pgs.

Castelluccia, Claude, et al., "EphPub: Toward robust Ephemeral Publishing", Network Protocols (ICNP), 2011 19th IEEE International Conference on, IEEE, (Oct. 17, 2011), 18 pgs.

Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.

Sawers, Paul, "Snapchat for ios lets you send photos to friends and set how long they're visible for", http ://thenextweb.com/apps/2012/05/07/ snapchat-for-ios-lets-you-send-photos-to-f riends-and-set-how-long-theyre-visible-for, (May 2012), 1-3 pgs.

Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.

U.S. Appl. No. 14/967,472, filed Dec. 14, 2015, Gallery of Videos Set to an Audio Time Line.

"U.S. Appl. No. 14/304,855, Corrected Notice of Allowance mailed Jun. 26, 2015", 8 pgs.

"U.S. Appl. No. 14/304,855, Final Office Action mailed Feb. 18, 2015", 10 pgs.

"U.S. Appl. No. 14/304,855, Non Final Office Action mailed Mar. 18, 2015", 9 pgs.

"U.S. Appl. No. 14/304,855, Non Final Office Action mailed Oct. 22, 2014", 11 pgs.

"U.S. Appl. No. 14/304,855, Notice of Allowance mailed Jun. 1, 2015", 11 pgs.

"U.S. Appl. No. 14/304,855, Response filed Feb. 25, 2015 to Final Office Action mailed Feb. 18, 2015", 5 pgs.

"U.S. Appl. No. 14/304,855, Response filed Apr. 1, 2015 to Non Final Office Action mailed Mar. 18, 2015", 4 pgs.

"U.S. Appl. No. 14/304,855, Response filed Nov. 7, 2014 to Non Final Office Action mailed Oct. 22, 2014", 5 pgs.

"U.S. Appl. No. 14/505,478, Advisory Action mailed Apr. 14, 2015", 3 pgs.

"U.S. Appl. No. 14/505,478, Final Office Action mailed Mar. 17, 2015", 16 pgs.

"U.S. Appl. No. 14/505,478, Non Final Office Action mailed Jan. 27, 2015", 13 pgs.

(56) References Cited

OTHER PUBLICATIONS

"U.S. Appl. No. 14/505,478, Response filed Jan. 30, 2015 to Non Final Office Action mailed Jan. 27, 2015", 10 pgs.
"U.S. Appl. No. 14/505,478, Response filed Apr. 1, 2015 to Final Office Action mailed Mar. 17, 2015", 6 pgs.
"U.S. Appl. No. 14/523,728, Non Final Office Action mailed Dec. 12, 2014", 10 pgs.
"U.S. Appl. No. 14/523,728, Notice of Allowance mailed Mar. 24, 2015", 8 pgs.
"U.S. Appl. No. 14/523,728, Notice of Allowance mailed Apr. 15, 2015", 8 pgs.
"U.S. Appl. No. 14/523,728, Notice of Allowance mailed Jun. 5, 2015", 8 pgs.
"U.S. Appl. No. 14/523,728, Response filed Aug. 25, 2014 to Non Final Office Action mailed Jan. 16, 2015", 5 pgs.
"U.S. Appl. No. 14/529,064, Non Final Office Action mailed Mar. 12, 2015", 20 pgs.
"U.S. Appl. No. 14/529,064, Response filed Feb. 5, 2015 to Restriction Requirement mailed Feb. 2, 2015", 6 pgs.
"U.S. Appl. No. 14/529,064, Response filed Mar. 26, 2015 to Non Final Office Action mailed Mar. 12, 2015", 8 pgs.
"U.S. Appl. No. 14/529,064, Restriction Requirement mailed Feb. 2, 2015", 5 pgs.
"U.S. Appl. No. 14/578,258, Non Final Office Action mailed Jun. 10, 2015", 12 pgs.
"U.S. Appl. No. 14/578,271, Response filed Jun. 19, 2015 to Restriction Requirement mailed Apr. 23, 2015", 6 pgs.
"U.S. Appl. No. 14/578,271, Restriction Requirement mailed Apr. 23, 2015", 8 pgs.
"U.S. Appl. No. 14/612,692, Non Final Office Action mailed Jul. 20, 2015", 25 pgs.
"iVisit Mobile Getting Started", IVISIT, (Dec. 4, 2013), 1-16.
Melanson, Mike, "This text message will self destruct in 60 seconds", readwrite.com, [Online]. Retrieved from the Internet: <http://readwrite.com/2011/02/11/this_text_message_will_self_destruct_in_60_seconds>, (Feb. 18, 2015).
Sawers, Paul, "Snapchatfor iOS Lets You Send Photos to Friends and Set How long They're Visible for", [Online]. Retrieved from the Internet: <http:/ /thenextweb.com/apps/2012/05/07/Snapchat-for-ios-lets-you-send-photos-to-friends-and-set-how-long-theyre-visiblefor/#! xCjrp>,, (May 7, 2012), 1-5.
"U.S. Appl. No. 14/506,478, Response filed Aug. 17, 2015 to Advisory Action mailed Apr. 14, 2015", 10 pgs.
"U.S. Appl. No. 14/529,064, Final Office Action mailed Aug. 11, 2015", 23 pgs.
"U.S. Appl. No. 14/578,271, Non Final Office Action mailed Aug. 7, 2015", 12 pgs.
"International Application Serial No. PCT/US2015/035591, International Search Report mailed Aug. 11, 2015", 5 pgs.
"International Application Serial No. PCT/US2015/035591, International Written Opinion mailed Aug. 11, 2015", 5 pgs.
U.S. Appl. No. 14/505,478, Corrected Notice of Allowance mailed May 18, 2016, 2 pgs.
U.S. Appl. No. 14/505,478, Notice of Allowance mailed Apr. 28, 2016, 11 pgs.
U.S. Appl. No. 14/505,478, Response filed Mar. 4, 2016 to Non Final Office Action mailed Sep. 4, 2015, 12 pgs.
U.S. Appl. No. 14/529,064, Non Final Office Action mailed Apr. 18, 2016, 21 pgs.
U.S. Appl. No. 14/578,258, Examiner Interview Summary mailed Nov. 25, 2015, 3 pgs.
U.S. Appl. No. 14/578,258, Notice of Allowance mailed Feb. 26, 2016, 5 pgs.
U.S. Appl. No. 14/612,692, Non Final Office Action mailed Mar. 28, 2016, 15 pgs.
U.S. Appl. No. 14/704,212, Final Office Action mailed U.S. Appl. No. 14/704,212, Final Office Action mailed Jun. 17, 2016, 12 pgs.
U.S. Appl. No. 14/704,212, Response filed Mar. 4, 2016 to Non Final Office Action mailed Dec. 4, 2015, 11 pgs.
U.S. Appl. No. 14/738,069, Non Final Office Action mailed Mar. 21, 2016, 12 pgs.
U.S. Appl. No. 14/738,069, Response filed Jun. 10, 2016 to Non Final Office Action mailed Mar. 21, 2016, 10 pgs.
U.S. Appl. No. 15/137,608, Preliminary Amendment filed Apr. 26, 2016, 6 pgs.
U.S. Appl. No. 15/152,975, Preliminary Amendment filed May 19, 2016, 8 pgs.
International Application Serial No. PCT/US2015/065821, International Search Report mailed Mar. 3, 2016, 2 pgs.
International Application Serial No. PCT/US2015/065821, Written Opinion mailed Mar. 3, 2016, 3 pgs.
U.S. Appl. No. 14/612,692, Response filed Jun. 28, 2016 to Non Final Office Action mailed Mar. 28, 2016, 14 pgs.

\* cited by examiner

PRIORITIZATION OF MESSAGES WITHIN GALLERY

CROSS-REFERENCE TO RELATED APPLICATIONS

This application is a continuation of and claims the benefit of priority to U.S. Ser. No. 14/523,728, filed Oct. 24, 2014, which is related to commonly owned U.S. Ser. No. 14/304,855, filed Jun. 13, 2014. This invention is also related to commonly owned U.S. Ser. No. 14/529,064, filed Oct. 30, 2014, each of which is hereby incorporated by reference in its entirety.

TECHNICAL FIELD

This invention relates generally to processing electronic messages in a computer network.

BACKGROUND

Mobile devices, such as smartphones, are used to generate messages. The messages may be text messages, photographs (with or without augmenting text) and videos. Users can share such messages with individuals in their social network. However, there is no mechanism for sharing messages with strangers that are participating in a common event.

BRIEF SUMMARY

In some embodiments, a computer implemented method of processing messages may include creating a gallery using messages received from user devices; scanning the messages to identify a selected message of messages; receiving, from an owner of the brand, a prioritization of the selected message; prioritizing, in response to the prioritization, the selected message in the gallery; and supplying the gallery to a user device for display to a user of the user device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
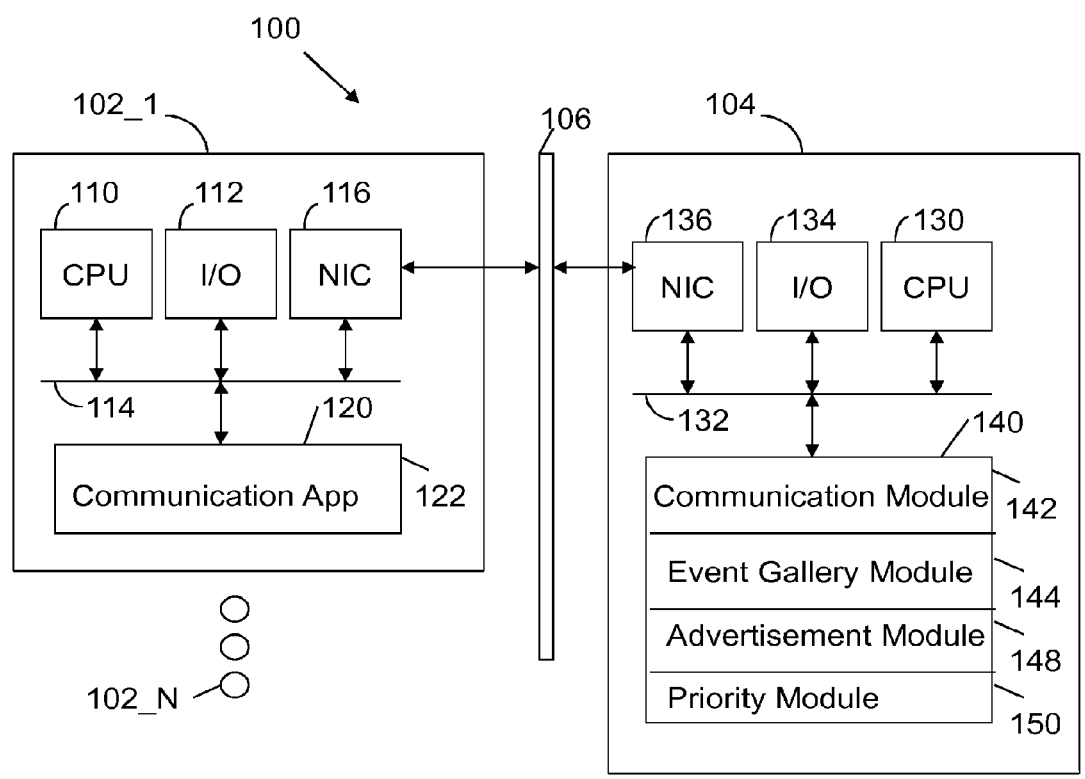
FIG. 1 illustrates a system configured in accordance with an embodiment of the invention.

Figure illustrates a system 100 configured in accordance with an embodiment of the invention. The system 100 includes a set of client devices 102_1 through 102N and at least one server 104 connected via a network 106. The network 106 may be any combination of wired or wireless networks.

Each client device 102 has standard components, such as a central processing unit 110 and input/output devices 112 connected via a network 114. The input/output devices 112 may include a touch display, dedicated control buttons, physical connectors, speakers and the like. A network interface circuit 116 is also connected to the bus 114 and provides connectivity to network 106. A memory 120 is also connected to the bus 114. The memory 120 stores a communication application 122. The communication application 122 includes instructions executed by CPU 110 to coordinate communications with server 104 and/or other client devices. The client device may be in the form of a tablet, smartphone, wearable technology, laptop computer or desktop computer.

The server 104 also includes standard components, such as a central processing unit 130, a bus 132, input/output devices 134 and a network interface circuit 136. A memory 140 is connected to the bus 132. The memory 140 stores a communication module 142. The communication module 142 includes instructions executed by the CPU 130 to coordinate communications with client devices 102. The memory 140 also stores an event gallery module 144. The event gallery module 144 includes instructions executed by the CPU 130 to store messages from participants in a live event. The messages form an event gallery, which may be supplied to a client device 102 in response to a request from a client device 102.

Figure 2:
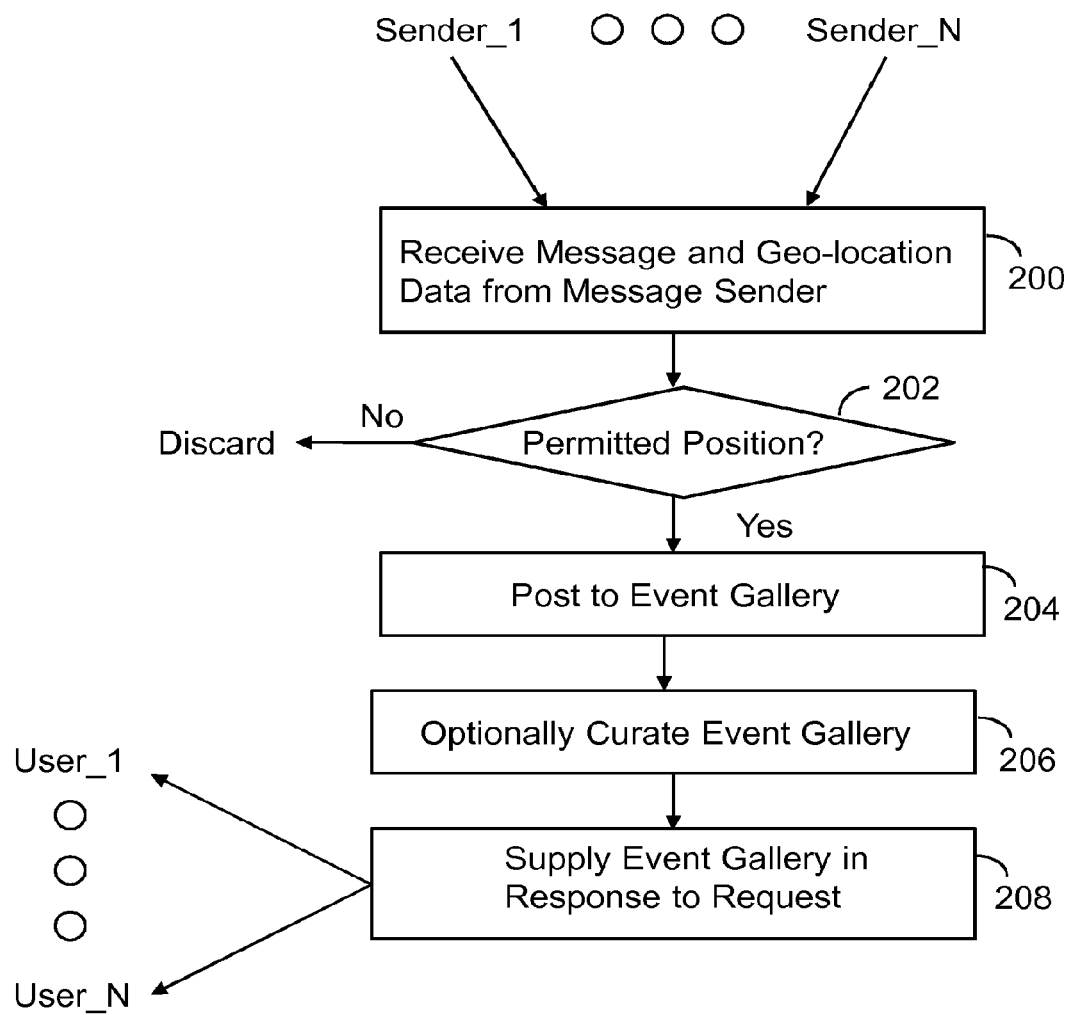
FIG. 2 illustrates server side processing associated with an embodiment of the invention.

FIG. 2 illustrates operations associated with an embodiment of the event gallery module 144. The top of the figure illustrates a set of message senders, i.e., Sender_1 through Sender_N. Each message sender is associated with a client device 102. The communication application 122 is configured to accompany a message with geo-location information. Typically, the geo-location information will be collected from a GPS chip resident in the client device. However, other geo-location information may also be used, such as cellular network geo-location information, self-reported geo-location information and the like.

The event gallery module 144 includes an administrative interface that allows one to define an event. For example, the administrative interface may prompt an event planner for event name, event description, event date, event time and event location. The event location is specified in physical coordinates (e.g., GPS coordinates) that define a geo-location fence associated with the event.

As previously indicated, messages from senders include geo-location information. The server 104 receives such messages and geo-location data 200 from any number of senders. For each message, the geo-location data is compared to the geo-location fence. If the message was not sent from within the geo-location fence it is not from a permitted position and it is therefore discarded (202—No). If the message is from a permitted position (202—Yes), the message is posted to an event gallery 204.

The event gallery module 144 may include a curation interface that allows an event planner to optionally curate the event gallery 206. For example, the curation interface may allow the event planner to delete inappropriate or redundant messages. The final operation of FIG. 2 is to supply the event gallery in response to requests 208 from any number of users.

Figure 3:
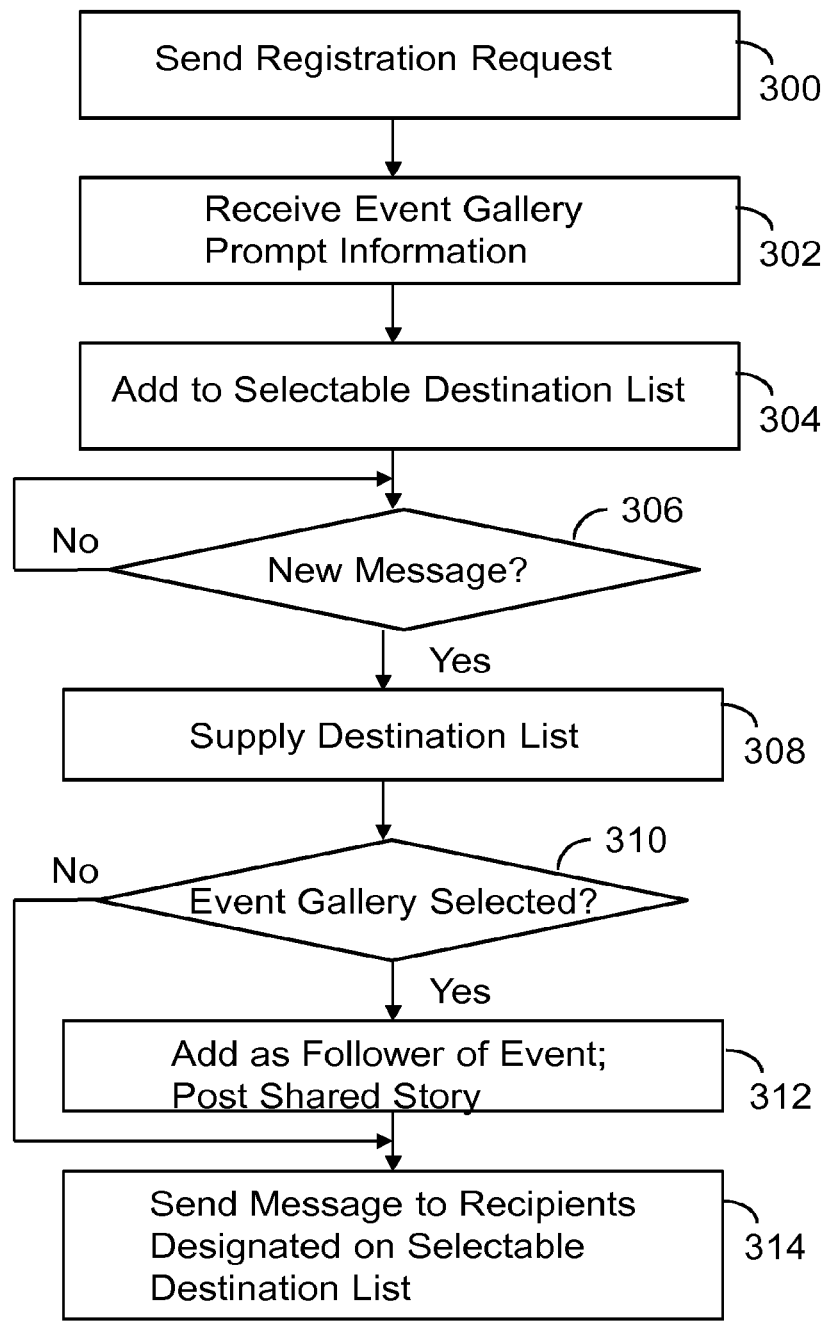
FIG. 3 illustrates client side processing associated with an embodiment of the invention.

FIG. 3 illustrates processing associated with the communication application 122 resident on a client device 102. The communication application 122 sends a registration request 300. The registration request may be an explicit request to join or follow an event. Alternately, the registration request may be triggered by sending geo-location data to server 104. The event gallery module 144 determines whether the geo-location data corresponds to a geo-location fence associated with an event. Event gallery prompt information is received 302 in response to a request. The event gallery prompt information may be indicia of the event, such as a brand, a textual description and the like. The event gallery prompt may be accompanied by a message welcoming the user to the event. The message may have additional information and instructions regarding the event. The event gallery prompt information is added to a selectable destination list 304. The selectable destination list 304 includes individuals in a user's social network. In this case, the selectable destination list is augmented with indicia of an event.

If a user generates a message (306—Yes) the destination list is supplied 308. The destination list includes individuals in a user's social network and indicia of the event and/or event gallery. If the event gallery is selected (310), the user is added as a follower of the event 312. So, for example, in the case where the user received the event gallery prompt in response to simply communicating geo-location data, the user may formally follow the event by posting a message (shared story) to the event gallery. That is, the event gallery module 144 adds the user to a list of event followers in response to the user posting a message to the event gallery. Finally, messages are sent to recipients designated on the selectable destination list 314. These recipients are typically individuals in the user's social network.

Figure 4:
FIGS. 4-8 illustrate graphical user interfaces that may be associated with embodiments of the invention.
Figure 5:
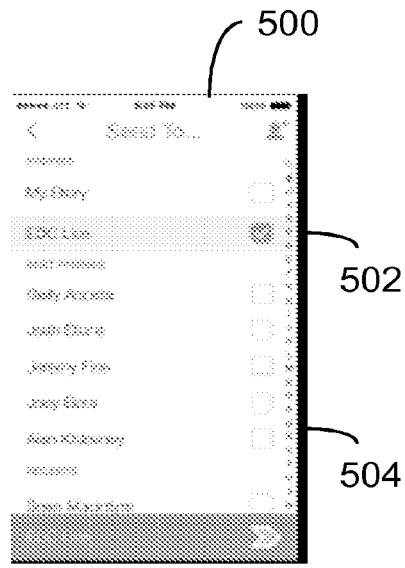
Figure 6:
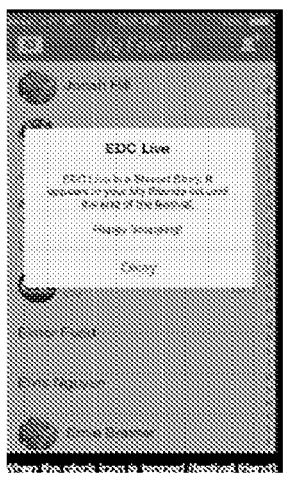
Figure 7:

FIG. 4 is an example of a message taken at an event. In this example, the message is a photograph, which may be augmented with text. FIG. 5 illustrates a selectable destination list 500. The selectable destination list 500 includes an entry for a live event 502 and entries 504 for individuals in a social network. Selecting the live event 502 from the selectable destination list 500 may result in a prompt as shown in FIG. 6. The prompt may explain terms associated with posting content to the event gallery. FIG. 7 illustrates an interface listing friends in a social network and one or more events that are being followed.

Figure 8:
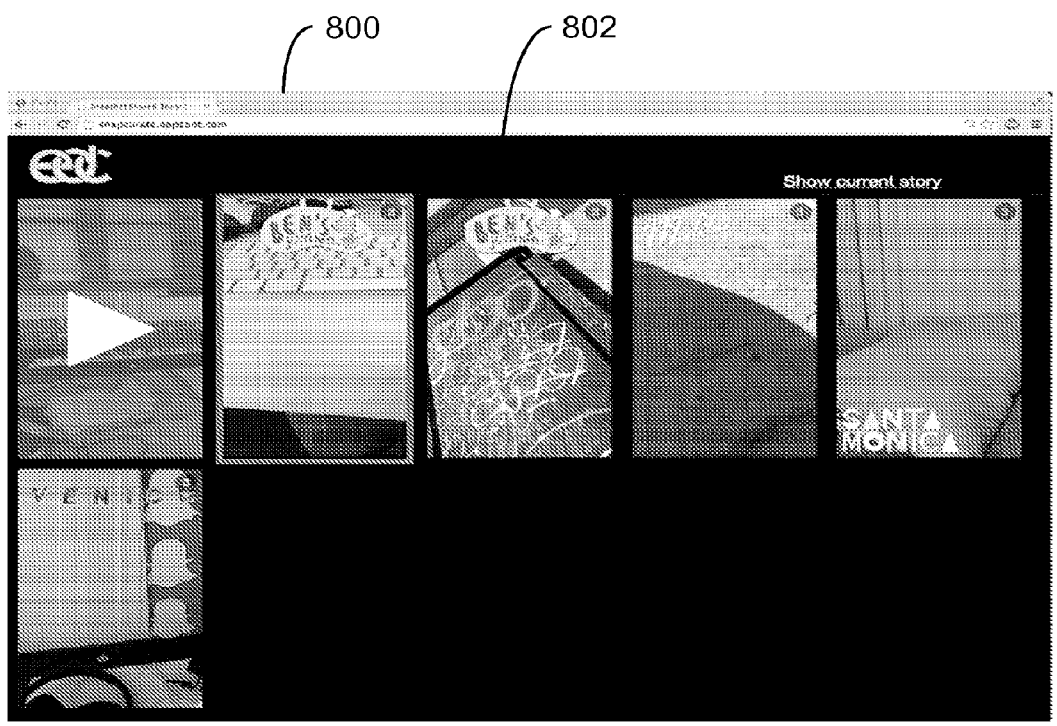

FIG. 8 is an example of an event gallery 800. The event gallery 800 includes individual posted messages 802. The messages may be photographs, videos or text messages. The event gallery may be available for a specified transitory period. For example, the specified transitory period may be the duration of an event. Indicia of the event gallery may appear in a list of friends (e.g., destination list) for the duration of the event. In one embodiment, the event gallery has individual ephemeral messages shown in a sequence. For example, a first image is shown for five seconds, and then a second image is shown for three seconds, etc.

An event gallery may be open to all event participants. Alternately, an event gallery may be formed for a subset of participants selected from a destination list or some other list (e.g., a list of co-workers at an event). An embodiment of the invention maintains an ongoing event gallery (shared story) for a geo-location. For example, the shared story may extend over months. Alternately, the shared story may be renewed every twenty-four hour period at a specified geo-location.

Figure 9:
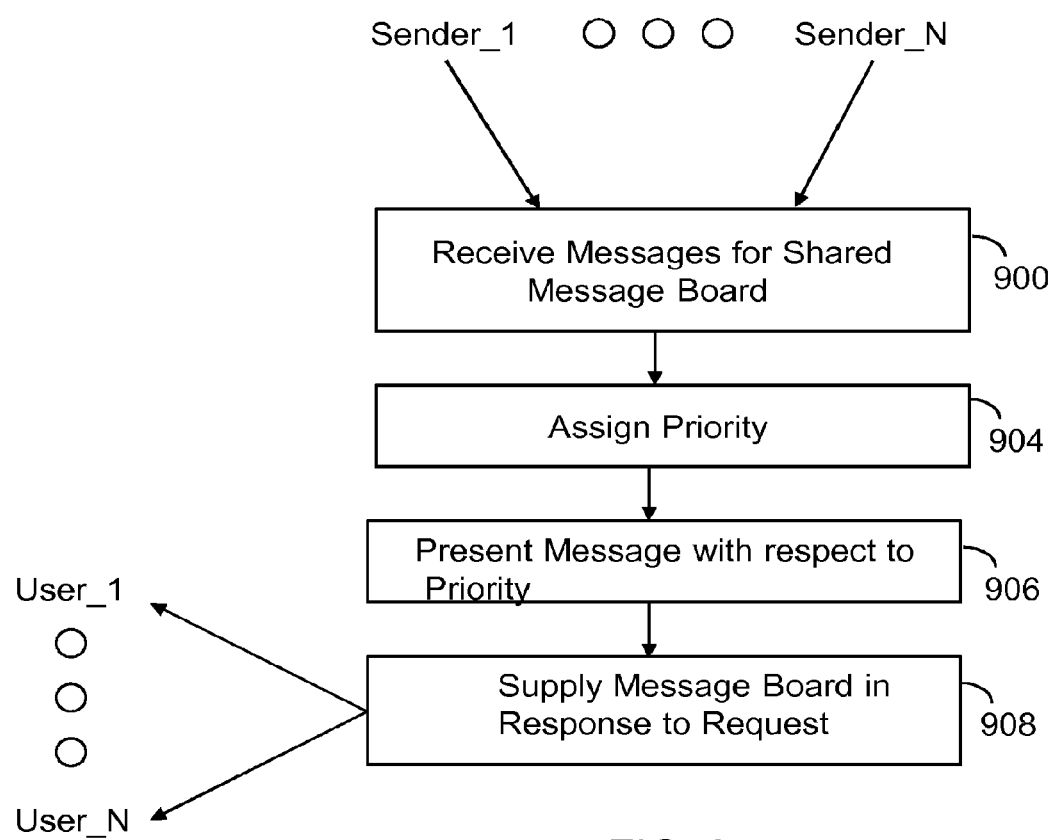
FIG. 9 illustrates server side processing associated with an alternate embodiment of the invention.

FIG. 9 illustrates processing operations associated with an alternate embodiment of the invention. The first processing operation of this embodiment is to receive messages for an event gallery 900 from one or more users, intended for distribution to recipients as described above. For example, users may transmit messages via any number of web or mobile channels to communication module 142. Once again, the messages may be text messages, photographs (with or without augmenting text or graphics) and videos (with or without augmenting text or graphics). For example, events could include concerts, music festivals, awards ceremonies, live sporting events, etc. Similarly, examples of geo-locations contemplated include university campuses, schools, office space of a corporation, private residences, parks, etc. The messages may or may not be associated with a specific event or geo-location. As described above, the event gallery is a listing or sequence of messages available to a set of users. The set of users may be a group designated by a user or event sponsor, etc. In other embodiments, the set of users may be an entire social network, users located within a geolocation, members of a club or organization, etc.

While many messages received from users may be assigned to a position within the event gallery based on order of receipt or randomly, other messages (e.g., advertisements or sponsored messages) may be assigned a priority 904 based on other criteria, as described below. These messages may then be presented in the event gallery in accordance with their assigned priorities 906.

Priority may be based upon sponsored content. Thus, sponsors or advertisers may be able to insert messages within an event gallery for display to users registered with a particular event gallery. For example, a particular brand or product may pay for inclusion (or favorable presentation) of a message within the event gallery. The favorable presentation may stem from a weight assigned to the message, where the weight is a function of the amount of consideration supplied by the sponsor. For example, an advertisement may require the payment of a certain minimum before being included in a given event gallery. Longer or earlier placements (with the event gallery) may command higher minimums. Sponsored content may be displayed on a flat fee or cost per view basis. In addition, video or augmented advertisements (with text, graphics, GIFs, animation, etc.) may similarly command premiums. Other factors considered in the weight of a message may include similarity in theme between the advertisement and the event. For example, toy advertisements may receive greater weight at a children's concert than would alcohol ads. Thus, in some embodiments, unsponsored messages may have no weight and may simply be organized on a temporal or other basis.

As discussed above, the favorable presentation may be in the form of a message placed early in a sequence of messages. Alternately, the favorable presentation may be in the form of a message of a relatively long duration in a sequence of ephemeral messages. In yet other embodiments, there may be circumstances when a message is not presented (e.g., failure to meet minimum bid, excess ad inventory, etc.).

A received message may also be assigned priority based upon endorsed content. For example, a user may endorse a particular brand or product. In such a case, an event gallery controlled by that user may favorably present a message with the brand or product within the event gallery. Weighting and presentation techniques discussed in connection with sponsored content may also be used for endorsed content.

Priority may be assigned based upon any number of evaluations of content. For example, the content of a message may be evaluated for indicia of sponsored content. The indicia may be in form of an observed brand or product in the content. The evaluation may be performed by optical character recognition, machine vision and similar techniques.

Another approach to evaluating the content is to evaluate the sender of the message. For example, if the sender of the message is a sponsor or an endorser, then a priority parameter is assigned in accordance with a favorable weight ascribed to the sponsoring sender or the endorsing sender.

Other factors that may be considered in determining the priority parameter may include senders that are celebrities, well-known individuals, or "influencers" (e.g., individuals with admired within a community).

The final processing operation of FIG. 9 is to supply the event gallery in response to a request 908. For example, a client device 102 may access server 104. The event gallery module 144 may include executable code to maintain the event gallery. The event gallery may be served from the server 104 to any number of users associated with client devices 102.

Referring back to FIG. 1, in some embodiments, memory 140 of server 104 may be configured to include an advertisement module 148 and a priority module 150. Advertisement module 148 includes instructions executable by CPU 130 to receive messages or advertisements from advertisers, and otherwise administer and implement the advertisement or sponsored messages features of certain embodiments. In some embodiments, advertisers access (or send) messages to advertisement module 148 through a channel distinct from other channels utilized by non-advertiser users. For example, advertisers may access advertisement module 148 through a webpage via a web browser or through a mobile application feature accessible for advertisement submission purposes.

Priority module 150 includes instructions executable by CPU 130 to receive weights and weighting information submitted by users (i.e., advertisers) and to determine priorities of messages. In some embodiments, priority module 150 may also be configured to insert advertisements into the 'stream' of other messages within an event gallery. In addition to these operations, priority module 150 may also be configured in a manner to receive bid amounts from advertisers associated with advertisement message submissions. Thus, in these embodiments, priority module 150 may compare bid amounts (as well as other priority information, if any) to determine the priority according to which an advertisement message may be displayed within an event gallery The advertising module 148 may include a scanning module to scan the content of messages for a specific brand. For example, in the case of a text based message (e.g., a word or text mark in the message), the scan may be in the form of a word recognition or matching process. Any recognized words, phrases or text may be compared against trademark databases for matches. In the case of a photograph or video, an optical character recognition module may be used to identify logos, symbols, or patterns associated with a brand (e.g., the Nike@Swoosh, etc.).

Upon recognition of a brand, a message may be sent by communication module 142 to a brand owner offering the brand owner an opportunity to prioritize the message in the event gallery. Thus, a brand owner may be afforded an opportunity to pay to have a message displaying their brand inserted into an event gallery and/or for favorable placement in event gallery.

In this regard, a copy of the image may be transmitted to the brand owner allowing the owner an opportunity to review a message before deciding to prioritize the message. In other embodiments, a brand owner may be given an opportunity to edit the message. For instance, a brand owner may choose to add graphics, animations, etc. The brand owner may also be afforded an opportunity to remove references to competing brands.

Alternately, an online dashboard of messages may be made available to a brand owner. The dashboard may contain each or several of the instances of the appearance of the brand owner's marks or logos. The owner is able to compare, side-by-side, each message before deciding which messages to prioritize.

In some embodiments, multiple brand messages may be inserted into a single event gallery. In these examples, the various brand owners may be allowed to bid for favorable placement of their messages within the event gallery. Specifically, a highest bidder's message may be placed near the beginning of the event gallery. Conversely, lower bidders may have their messages inserted only if there is sufficient message inventory. Alternately, the duration of an ephemeral message may be based upon bid criteria.

The entire event may be sponsored by the brand owner. In this case, a 'welcome' or 'sponsored by' message may be presented at the beginning of the event gallery, followed by several other messages containing a particular brand or message throughout the gallery. Alternately, a third-party may sponsor the event and allow many brand owners to bid for favorable placement of messages.

The event gallery may have a title that indicates sponsored or endorsed content. The event gallery may be constructed from messages from a single user. In such a case, the event gallery is available to friends of the single user.

The event gallery may be constructed from messages from a pre-selected group of users (such as a group of friends). The event gallery is available to the pre-selected group of users. The event gallery may be constructed by a sponsor with the event gallery available to all individuals in a social network. In this context, a social network is a computer implemented application that facilitates computer network communications between individuals, where the computer network communications may be posts, comments, messages, images and the like.

The event gallery may be constructed from messages from users within a geolocation fence associated with an event. Alternately, the event gallery may be available to individuals following an event.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A computer implemented method of processing messages, the method comprising:
    creating a gallery using a plurality of messages received from a plurality of user devices;
    scanning the plurality of messages to identify a selected message of the plurality of messages that includes a brand;
    receiving, from an owner of the brand, a prioritization of the selected message;
    prioritizing, in response to the prioritization, the selected message in the gallery; and
    supplying the gallery to a user device for display to a user of the user device.

2. The computer implemented method of claim 1, wherein the gallery is associated with an event.

3. The computer implemented method of claim 1, wherein the plurality of user devices are located within a geofence.

4. The computer implemented method of claim 1, wherein the selected message includes visual content.

5. The computer implemented method of claim 4, wherein the visual content is at least one of a photograph or a video.

6. The computer implemented method of claim 4, wherein the scanning includes using optical character recognition techniques on the visual content to identify the selected message.

7. The computer implemented method of claim 1, wherein the scanning includes identifying logos or graphics, within the selected message, associated with the brand.

8. The computer implemented method of claim 1, wherein the scanning includes text based word matching of textual content of the selected message.

9. The computer implemented method of claim 1, wherein the receiving of the prioritization includes receiving consideration from the owner of the brand.

10. The computer implemented method of claim 1, wherein the receiving of the prioritization includes receiving selection of the selected message from an online dashboard including a plurality of branded messages associated with the brand.

11. The computer implemented method of claim 1, wherein the creating of the gallery is controlled by a party that allows multiple owners of different brands to prioritize the plurality of messages.

12. The computer implemented method of claim 1, wherein the gallery is available for supplying for a specified transitory period.

13. The computer implemented method of claim 12, wherein each of the plurality of messages is displayed in sequence for a specified period of time, and wherein the gallery may be repeatedly displayed only before expiration of the specified transitory period.

14. The computer implemented method of claim 1, wherein the prioritization comprises prioritizing a placement of the selected message within the gallery.

15. A server to process messages, the server comprising:
    a processor; and
    a memory storing instructions that, when executed by the processor, configure the server to:
        create a gallery using a plurality of messages received from a plurality of user devices;
        scan the plurality of messages to identify a selected message of the plurality of messages that includes a brand;
        receive, from an owner of the brand, a prioritization of the selected message;
        prioritize, in response to the prioritization, the selected message in the gallery; and
        supply the gallery to a user device for display to a user of the user device.

16. The server of claim 15, wherein the gallery is associated with an event.

17. The server of claim 15, wherein the plurality of user devices are located within a geofence.

18. The server of claim 15, wherein the scanning includes using optical character recognition techniques on visual content of the plurality of messages to identify the selected message.

19. The server of claim 15, wherein the scanning includes identify logos or graphics, within the selected message, associated with the brand.

20. The server of claim 15, wherein the scanning includes text based word matching of textual content of the selected message.

* * * * *